United States Patent [19]

MacNeilage

[11] 3,890,993

[45] June 24, 1975

[54] EARTHQUAKE ACTUATED FLUID FLOW OBSTRUCTING DEVICE

[76] Inventor: George C. MacNeilage, 9411 Cape Cod Dr., Huntington Beach, Calif. 92646

[22] Filed: Jan. 2, 1974

[21] Appl. No.: 430,164

[52] U.S. Cl. .................. 137/45; 137/45; 137/39
[51] Int. Cl. .......................................... F16k 17/36
[58] Field of Search .................. 137/38, 39, 45, 46

[56] References Cited
UNITED STATES PATENTS

| | | | |
|---|---|---|---|
| 2,158,753 | 5/1939 | Hansen | 137/45 |
| 2,965,116 | 12/1960 | Boone et al. | 137/39 |

Primary Examiner—Robert G. Nilson
Attorney, Agent, or Firm—William C. Babcock

[57] ABSTRACT

A device that is connected to a first end of a tubular member through which fluid flows to shut off the flow of said fluid in the event that the device is subjected to an earthquake shock of greater than a predetermined magnitude. The device includes a valve body that rotatably supports a transverse shaft that extends through the interior thereof and to which shaft a valve member is secured. Spring means at all times tend to pivot said shaft and valve member from a first position where fluid may flow through the valve body and tubular member to a second position where such flow is obstructed. A pendulum assembly is pivotally supported from the valve body and removably engages an arm secured to said shaft to maintain said shhaft and valve member in a first position. Upon the device being subjected to an earthquake shock of greater than a predetermined magnitude the pendulum assembly pivots either transversely or longitudinally relative to the valve body to the extent that it is disengaged from the arm and allows the spring means to pivot the arm, shaft and valve member to the second fluid flow obstructing position.

4 Claims, 5 Drawing Figures

EARTHQUAKE ACTUATED FLUID FLOW OBSTRUCTING DEVICE

BACKGROUND OF THE INVENTION

1. Field of the Invention

Earthquake Actuated Fluid Flow Obstructing Device.

2. Description of the Prior Art

In geographical areas subject to earthquakes an ever present danger is that in a severe earthquake gas lines will be broken to permit escape of gas into residences and buildings. Such escaping gas may be ignited by broken electric lines that are arcing or by contact pilot lights that are still functioning. The ignited escaping gas will in all probability result in residences and building catching on fire, and great damage resulting therefrom.

Prior to the present invention there was no simple inexpensive device that operated automatically to shut off the flow of gas in a line when the device was subjected to an earthquake of greater than a predetermined magnitude.

The primary purpose in devising the present invention is to supply a spring loaded valve that has a pendulum assembly associated therewith, with the valve normally permitting the flow of gas therethrough, but the pendulum assembly when the valve is subjected to an earthquake of greater than a predetermined magnitude swinging through an arc of sufficient magnitude to disengage it from a spring loaded valve member and allow the valve member to a gas flow obstructing position.

Another object of the invention is to furnish an earthquake actuated gas flow obstructing device that has a simple mechanical structure, is relatively inexpensive to manufacture, is simple and easy to install in an operative position, and one that operates automatically after installation.

A further object of the invention is to provide one of such structure that it may be installed on an existing check valve to so modify the latter that it will automatically close when subjected to an earthquake shock of greater than a predetermined magnitude.

Yet another object of the invention is to provide an earthquake actuated spring loaded shut off valve that is sensitive to earthquake shock waves traveling either longitudinally or transversely relative to the device, or in directions intermediate the two last mentioned directions.

SUMMARY OF THE INVENTION

The earthquake actuated device is connected to a first end of a tubular member through which gas or other fluid enters to flow longitudinally through the tubular member. The device includes a hollow body having first and second longitudinally spaced openings therein, with the first opening connected to the first end of the tubular member.

A shaft having a projecting first end portion is rotatably and sealingly supported in a transverse position in the valve body, with the shaft having a valve member rigidly secured thereto that normally occupies a first position where gas or other fluid may enter the second opening in the body to flow through the latter into the tubular member. However, the valve member is capable of also occupying a second position where it is in sealing contact with an internal valve seat in the body, and flow of fluid between the second and first openings is obstructed. A first arm is rigidly secured to the projecting end of the shaft. Spring means are provided that at all times tend to pivot the first arm, shaft and valve member in a direction to dispose the valve member in the first position.

The valve body supports a second arm on which a pendulum assembly is pivotally supported, and the assembly when subjected to a shock capable of pivoting either longitudinally or transversely relative to the valve body. When the valve body is subjected to an earthquake shock of greater than a predetermined magnitude, the pendulum assembly swings through an arc sufficient to disengage it from the first arm. The spring means then pivot the first arm, shaft and valve member in a direction to place the valve member in sealing engagement with the valve seat until the device is reset manually to place the first arm and pendulum assembly in engagement. After the valve member has moved to the first position further flow of fluid or gas through the device is terminated until the device is reset manually.

DESCRIPTION OF THE PREFERRED EMBODIMENT

Figure 1:
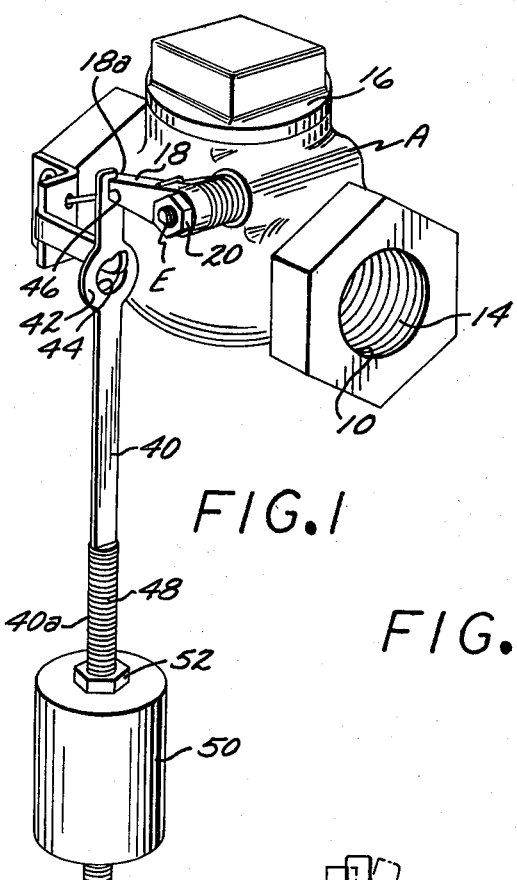
FIG. 1 is a perspective view of the device with the pendulum assembly so disposed as to maintain the valve member in a first position.
Figure 3:
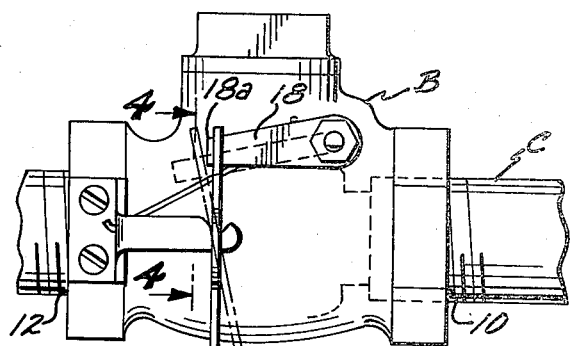
FIG. 3 is a side elevation view of the device, with the position the pendulum assembly occupies when subjected to a longitudinally directed earthquake wave being illustrated in phantom line.
Figure 5:
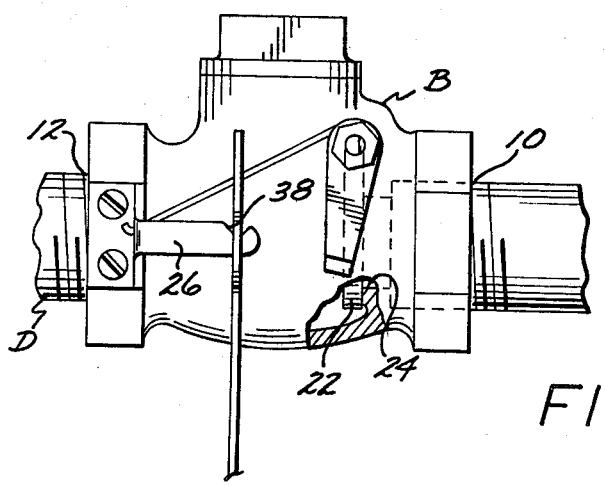
FIG. 5 is a side elevational view of the device after the valve member has pivoted to a second position to sealingly engage a valve seat.

The invention A as best seen in FIGS. 1, 3 and 5 includes a valve body B that has first and second longitudinally spaced openings 10 and 12 therein. First opening 10 by conventional means such as threads 14 is connected to a first end 16 of a tubular member C through which it is desired to have a fluid (not shown) such as gas flow. A line D is connected to the second opening 12 as shown in FIG. 5 and supplies the fluid that is to flow through tubular member C.

The valve body B is illustrated in the drawing as having an opening in the top that is normally closed by a plug 16. The valve body B as shown in FIGS. 1 and 5 has a transverse shaft E pivotally and sealingly supported therein, and with the shaft including an outwardly projecting end portion to which a first arm 18 is rigidly secured by conventional means 20. Shaft E rigidly supports a valve member 22, which valve member when in the first position illustrated in FIG. 5 is in sealing pressure contact with a valve seat 24 that is adjacently disposed to the first opening 10.

Figure 2:
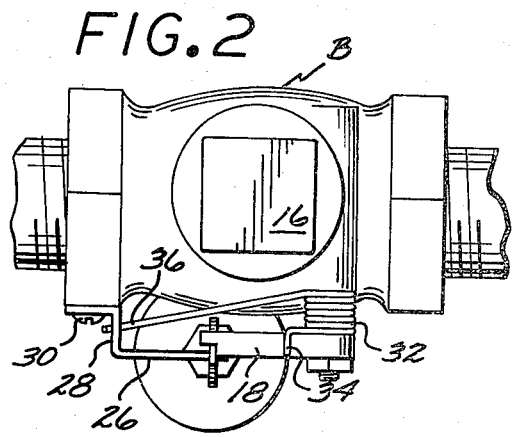
FIG. 2 is a top elevational view of the device.

A second arm 26 is supported from the valve body B by a bracket 28. The bracket 28 is secured to the valve body by screws 30 or other suitable fastening means. A helical spring 32 that is tensioned encircles the projecting end portion of shaft E, with the spring including a first end 34 that engages first arm 18, and a second end 36 that engages bracket 28 as may be seen in FIG. 2. The spring 32 at all times tends to pivot first arm 18, shaft E, and valve member 22 from a first position in which the valve member does not obstruct fluid flow through the valve body B to a second position as shown in FIG. 5 where the valve member is in sealing contact with valve seat 24.

Movement of the valve member 22 from the first to the second position is except in an earthquake of greater than a predetermined magnitude prevented by the pendulum assembly F. The second arm 26 is preferably formed from a rigid strip of material that is horizontally disposed and has a V-shaped notch 38 formed in the upper portion thereof. Pendulum assembly F includes a vertically disposed strip 40 of a rigid material, that has an enlarged portion 42 intermediate the ends thereof in which a circular opening 44 is formed. The opening 44 has a diameter substantially greater than the depth of the second arm 26. The upper end portion of strip 40 has a transverse recess 46 formed therein that engages an outer end portion 18a of first arm 18. The lower portion 40a of strip 40 is of circular transverse cross section and has threads 48 formed thereon. A weight 56 that has a tapped bore (not shown) extending longitudinally therethrough engages the threads 48. A lock nut 52 is mounted on threads 48 and bears against the upper surface of weight 50 to prevent the weight from rotating on portion 40a after it has been adjusted to a desired position thereon.

When the invention A is subjected to an earthquake wave in a directly longitudinal to the valve body B, the pendulum F will swing to the position shown in phantom line in FIG. 3, and the recess 46 becomes disengaged from the first arm 18. The spring 32 immediately pivots the first arm 18, shaft E and valve member 22 to the second position shown in FIG. 5 where the valve member is in pressure contact with the seat 24. The valve member 22 will remain in sealing contact with the seat 24 until the first arm 18 is manually operated to place it in engagement with the recess 46 as shown in FIG. 1.

Figure 4:
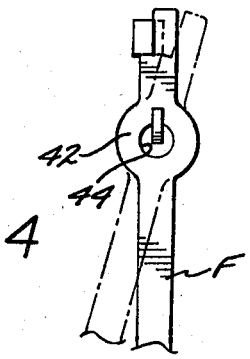
FIG. 4 is a fragmentary and elevational view of the upper portion of the pendulum assembly taken on the line 4-4 of FIG. 3.

In the event that the earthquake shock wave travels in a transverse direction relative to the valve body B, the pendulum assembly F as may be seen in FIG. 4, will pivot from the normal vertical position illustrated in that Figure to the position shown in phantom line to disengage the recess 46 from the first arm 18 and allow the valve member 22 to move to the second position as previously described.

In the event that the earthquake shock wave is in a directly intermediate longitudinal and transverse position relative to the valve body B the pendulum assembly will swing both longitudinally and transversely relative to the first arm 18, to disengage the recess 46 from the arm, and permit the valve member 22 to pivot to the first position. By manually adjusting the weight 50 on the strip 40, the sensitivity of the invention A to an earthquake shock may be controlled. The lower the weight 50 is on the strip 40 the more sensitive will the invention be to earthquake shocks, and as a result the invention may be adjusted for the recess 46 to be disengaged from the first arm 18 only when there is an earthquake shock of a predetermined intensity.

The use and operation of the invention has been described previously in detail and need not be repeated.

I claim:

1. In combination with a tubular member that has a first end through which fluid enters to flow through said tubular member, a device for terminating the flow of said fluid through said tubular member when said device is subjected to an earthquake shock of greater than a predetermined magnitude, said device including:
   a. a hollow valve body having first and second spaced openings therein, with said body including an internal seat adjacent said first opening, said first end of said tubular member connected to said first opening in said tubular member, and said fluid being supplied to said tubular member through said second opening in said body;
   b. a transverse shaft rotatably and sealingly supported in said body, said shaft having a first end portion that projects from said body;
   c. a valve member pivotally movable in said body, and rigidly secured to said shaft, said valve member normally occupying a first position to permit fluid to flow through said body to said tubular member, but said valve member capable of occupying a second position in which it is in sealing contact with said seat to prevent fluid from flowing through said body to said first tubular member;
   d. a first arm secured to said first end portion of said shaft and normally disposed thereto, said arm having an outer end portion;
   e. spring means that at all times tend to pivot said arm, shaft and valve member in a direction to dispose said valve member in said second position;
   f. a second arm rigidly secured to said body, said second arm including an outer end portion adjacently disposed to said outer end portion of said first arm when said valve member is in said first position; and
   g. a pendulum assembly pivotally supported from said second arm and capable of pivoting both longitudinally and transversely relative to said body when said device is subjected to an earthquake shock, with said assembly removably engaging said outer end portion of said arm to maintain said valve member in said first position, and said pendulum assembly when subjected to an earthquake shock above a predetermined magnitude pivoting either longitudinally or transversely relative to said body to become disengaged from said outer end portion of said first arm to allow said spring means to pivot said first arm, shaft and valve member to dispose said valve member in said second position where it will so remain until said first arm, shaft and valve member are manually pivoted to dispose said valve member in said first position and said pendulum assembly in engagement with said outer end portion of said first arm.

2. The combination as defined in claim 1 in which said pendulum assembly includes:
   h. an elongate vertically disposed strip having upper and lower ends, said strip having an opening intermediate said ends through which said second arm extends to pivotally support said strip for either transverse or longitudinal movement realtive to said valve body, and said strip including means that removably engage said first arm to maintain said valve member in said second position; and
   i. a weight mounted on said strip adjacent said lower end thereof, with said weight when subjected to an earthquake shock of greater than a predetermined magnitude causing said strip to pivot on said second arm to the extent that said means is disengaged from said first arm to permit said spring means to pivot said first arm, shaft and valve member in a direction for said valve member to occupy said second position.

3. The combination as defined in claim 2 that in addition includes:
j. first means for manually adjusting said weight to a desired longitudinal position on said strip to control the sensitivity of said pendulum assembly to earthquake shocks.

4. The combination as defined in claim 2 in which said means is a recess formed in said strip adjacent said upper end, with said recess removably engaging said first area.

* * * * *